(12) United States Patent
Shandross

(10) Patent No.: US 7,100,497 B2
(45) Date of Patent: Sep. 5, 2006

(54) HIGH TEMPERATURE, OIL SAVING, RAPID COOK FRYER SYSTEM

(75) Inventor: Richard A. Shandross, Arlington, MA (US)

(73) Assignee: Pitco Frialator, Inc., Concord, NH (US)

( * ) Notice: Subject to any disclaimer, the term of this patent is extended or adjusted under 35 U.S.C. 154(b) by 439 days.

(21) Appl. No.: 09/949,979

(22) Filed: Sep. 12, 2001

(65) Prior Publication Data
US 2003/0047084 A1 Mar. 13, 2003

(51) Int. Cl.
A47J 37/12 (2006.01)

(52) U.S. Cl. .............................. 99/330; 99/333; 99/342; 99/403

(58) Field of Classification Search .................. 99/330, 99/333, 342, 403
See application file for complete search history.

(56) References Cited

U.S. PATENT DOCUMENTS

| | | | |
|---|---|---|---|
| 3,210,193 A | 10/1965 | Martin | |
| 3,634,095 A | 1/1972 | Willard | |
| 3,649,305 A | 3/1972 | Wilder | |
| 3,839,951 A | 10/1974 | Palmason | |
| 3,894,483 A | 7/1975 | Anetsberger et al. | |
| 4,041,852 A | 8/1977 | Keating | |
| 4,091,801 A | 5/1978 | Lazaridis et al. | |
| 4,254,153 A | 3/1981 | Ross et al. | |
| 4,457,947 A | 7/1984 | Schmidt et al. | |
| 4,489,646 A | 12/1984 | Schmidt et al. | |
| 4,574,185 A | 3/1986 | Wenger | |
| 4,602,612 A | 7/1986 | Schwizer | |
| 4,623,544 A | 11/1986 | Highnote | |
| 4,646,793 A * | 3/1987 | Sherratt | 141/1 |
| 4,704,290 A | 11/1987 | Fritzsche | |
| 4,717,809 A * | 1/1988 | Schwizer | 219/438 |
| 4,913,041 A | 4/1990 | Taber et al. | |
| 4,913,042 A | 4/1990 | Miller | |
| 4,974,501 A | 12/1990 | Grob et al. | |
| 5,249,511 A * | 10/1993 | Shumate et al. | 99/408 |
| 5,598,767 A | 2/1997 | Minari et al. | |
| 5,601,011 A | 2/1997 | Minari et al. | |
| 5,643,626 A | 7/1997 | Henson et al. | |
| 5,718,934 A | 2/1998 | Hayakawa | |
| 5,809,995 A | 9/1998 | Kobayashi et al. | |
| 5,827,556 A | 10/1998 | Maher, Jr. | |
| 5,836,238 A | 11/1998 | Kobayashi | |
| 5,942,269 A | 8/1999 | Casey et al. | |
| 5,979,303 A | 11/1999 | Kobayashi et al. | |
| 6,009,794 A | 1/2000 | Casey et al. | |
| 6,058,245 A | 5/2000 | McNamara, Jr. | |
| 6,095,037 A | 8/2000 | Savage et al. | |
| 6,470,794 B1 * | 10/2002 | Takahashi | 99/408 |

* cited by examiner

Primary Examiner—Drew Becker

(57) ABSTRACT

A deep fat fryer able to quickly cook food items, in about one-third to one-half of a typical cook time in the art for corresponding food items, includes a high powered, preferably high efficiency heating unit utilized to establish a cooking oil temperature in the order of about forty or more degrees Fahrenheit above a typical cook time, while preferably remaining lower than or equal to 410° F. A controller regulates the heat input from the heating unit so as to keep the temperature of the oil from dropping drastically after a product to be fried is placed in the oil for cooking. The amount of cooking oil employed is minimized. A sensing arrangement is utilized to input sensed operating conditions to the controller in order to maintain a desired operating temperature and oil level.

11 Claims, 5 Drawing Sheets

HIGH TEMPERATURE, OIL SAVING, RAPID COOK FRYER SYSTEM

BACKGROUND OF THE INVENTION

1. Field of the Invention

The present invention pertains to the art of cooking and, more particularly, to an oil-based fryer system designed for use in a high heat input rate, a high temperature range, with a minimal amount of oil, to perform rapid cooking operations.

2. Discussion of the Prior Art

Oil-based frying is commonly used as a cooking method for a wide range of food. Of particular interest to the present invention is the use of fryers in fast food restaurants to cook various food items. Compared to preparing drinks and assembling burgers and sandwiches, frying is a time consuming process. The cooking of french fries is of particular concern due to their associated short holding times. More specifically, it is generally desired to limit the time, between cooking of the fries and the selling thereof, to be in the order of seven to ten minutes. If longer holding times are permitted, customer dissatisfaction can ensue due to poor product quality which, in turn, can negatively affect the business and its reputation. Due to these time constraints, it is often necessary to cook new fries to order, which typically takes from 2½ to 4 minutes, plus time for salting, bagging and serving. As a result, the serving of french fries represents the most common source of customer waiting time delays in fast food restaurants.

To address these concerns, a typical fast food restaurant may have up to three fryers in place to minimize delays, particularly during peak business hours. During off-peak hours, the same number of fryers would obviously not be needed. Of course, whenever the fryers are on, a degrading of the oil occurs, sometimes without a corresponding production of a commercially viable product. In general, the quality of the oil in a deep fat fryer will inherently degrade continuously over time, eventually reaching a level that affects the quality of the product in an unacceptable manner. The general practice in the food service industry is therefore to dispose of vats of oil used for deep fat frying on a regular basis, ranging from daily to weekly. Oil cost is in fact one of the largest components of the total operating expense for fried products. Of course, a certain amount of that cost is unavoidable as the oil becomes part of the product being sold, generally in the order of 15% of the final product weight.

When cooking french fries, there are two major processes taking place. In the center of the french fry, the potato is cooked in a manner similar to boiling, with raw potato flavors being stripped out by steam. Steam is generated in the core itself and leaves the french fry through pores in the potato. Physical chemistry dictates that the temperature of the core cannot rise above about 212° F. On the other hand, moisture at the outer surface of the french fry will have evaporated to dry out the potato, so the temperature can approach that of the oil itself. At these temperatures, typically at approximately 300°–350° F., the potato is essentially being toasted and the characteristics that distinguish french fries from boiled potatoes are produced. Toasting is primarily a chemical process which rapidly accelerates as temperature increases.

Although increasing the temperature of the oil is known to reduce the necessary frying time, known fryers have a practical upper limit. That is, at some point, toasting would occur so fast that the outer surface of the potato would burn before the raw potato flavors can be stripped from the core. In addition, use of any higher temperatures would inherently speed up the degradation of the cooking oil which limits the useful lifetime of the oil in the fryer. Because of oil degradation, and the economics of disposal, frying is rarely done above 375° F. For french fries, cooking oil is typically kept at 350° F. or less.

In addition, during the course of cooking a batch of french fries, the temperature of the cooking oil will dip down as much as 50° F. Because of this drop, a graph of oil temperature versus time over such a cooking operation is often referred to as a "U-curve" (see enclosed FIG. 6). The precipitous drop in temperature is a result of melting and/or vaporizing the large quantity of free moisture present in the original french fries. Actually, more than three-quarters of the total energy required to cook fries is consumed by vaporizing/melting, with approximately half of this energy being expended in essentially the first 10–15 seconds of the cooking operation. This oil temperature drop does not stop until vaporization is balanced or exceeded by heat arrival to the fries, which depends on a combination of heat input to the fryer and dispersion of the heat throughout the oil. When the temperature drop of this U-curve is considered, it can be seen that the amount of cooking time improvement that can be achieved through raising oil temperature in current fryers is small.

Attempts have been made in the prior art to reduce cook times in fryers, as well as to extend the useful life of the oil. To this end, it has been proposed in the art to provide a recirculation system for a fryer wherein the oil can be continuously or periodically filtered. At the same time, slightly elevated operating temperatures of the oil can be achieved. However, regardless of these attempted improvements, the technology utilized in connection with commercial fryer arrangements, particularly those found in fast food restaurants, have not changed for quite a lengthy period of time. More specifically, cook times generally in the order of, say three minutes for typical ¼" shoestring french fries are still employed almost invariably throughout the industry. Therefore, there still exists a need in the art for an improved oil-based fryer system which can significantly reduce the associated cook time, while reducing or eliminating oil disposal, thereby representing significant efficiency and cost effective advantages in the industry. In addition, such a rapid cooking fryer arrangement should minimize the actual number of fryers needed to produce a given output, thereby reducing not only initial expenditures for machinery, but also representing cost savings associated with reduced spacing needed for the machines.

SUMMARY OF THE INVENTION

The present invention is directed to a deep fat fryer which is able to quickly cook food items in about one-third to one-half of a typical cook time in the art for corresponding food items. In accordance with the invention, a high powered, preferably high efficiency heating unit is utilized to establish a cooking oil temperature in the order of about forty or more degrees Fahrenheit above a typical cook temperature, while preferably remaining lower than 410° F. In the most preferred form of the invention, a direct fired, high powered, high efficiency infrared gas burner is utilized. A controller regulates the heat input from the heating unit so as to keep the temperature of the oil from dropping drastically after a product to be fried is placed in the oil for cooking. The amount of cooking oil employed is minimized to only slightly more than enough to cover the product, e.g., preferably between 1/8" and 1/2" above the product. Most preferably, the volume of cooking oil at the cooking temperature is in the order of 3.0 to 4.75 times the volume of the food items. A sensing arrangement is utilized to input sensed operating conditions to the controller for use in connection with regulating the heating unit. In addition, low oil level conditions are determined, such as by a sensor or calculating arrangement, in order to maintain a desired oil level by balancing the amount of new oil added versus the amount of oil inherently withdrawn from the vat with the product being cooked.

With this arrangement, the total amount of time needed to cook french fries or other food items is brought down to the same magnitude of time as the preparation of a sandwich and drink order. The rapid cooking arrangement also reduces the amount of oil transferred to the product. This results in reduced oil cost and a healthier food product. Therefore, the invention represents a significant advantage to both the restauranteur and the consumer. In any event, additional objects, features and advantages of the present invention will become more fully apparent from the following detailed description of a preferred embodiment thereof when taken in conjunction with the drawings wherein like reference numerals refer to corresponding parts in the several views.

DETAILED DESCRIPTION OF A PREFERRED EMBODIMENT

Figure 1:
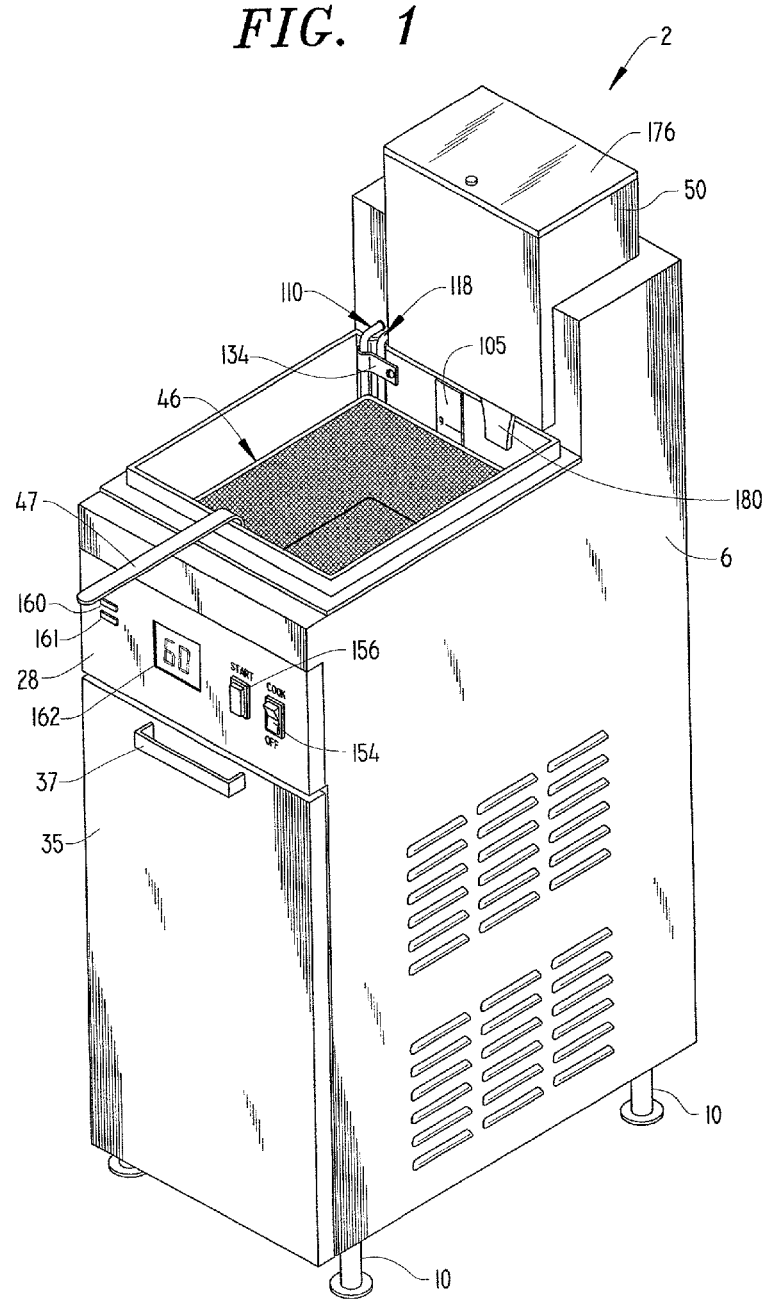
FIG. 1 is a perspective view of a rapid cook fryer system constructed in accordance with the present invention.
Figure 2:
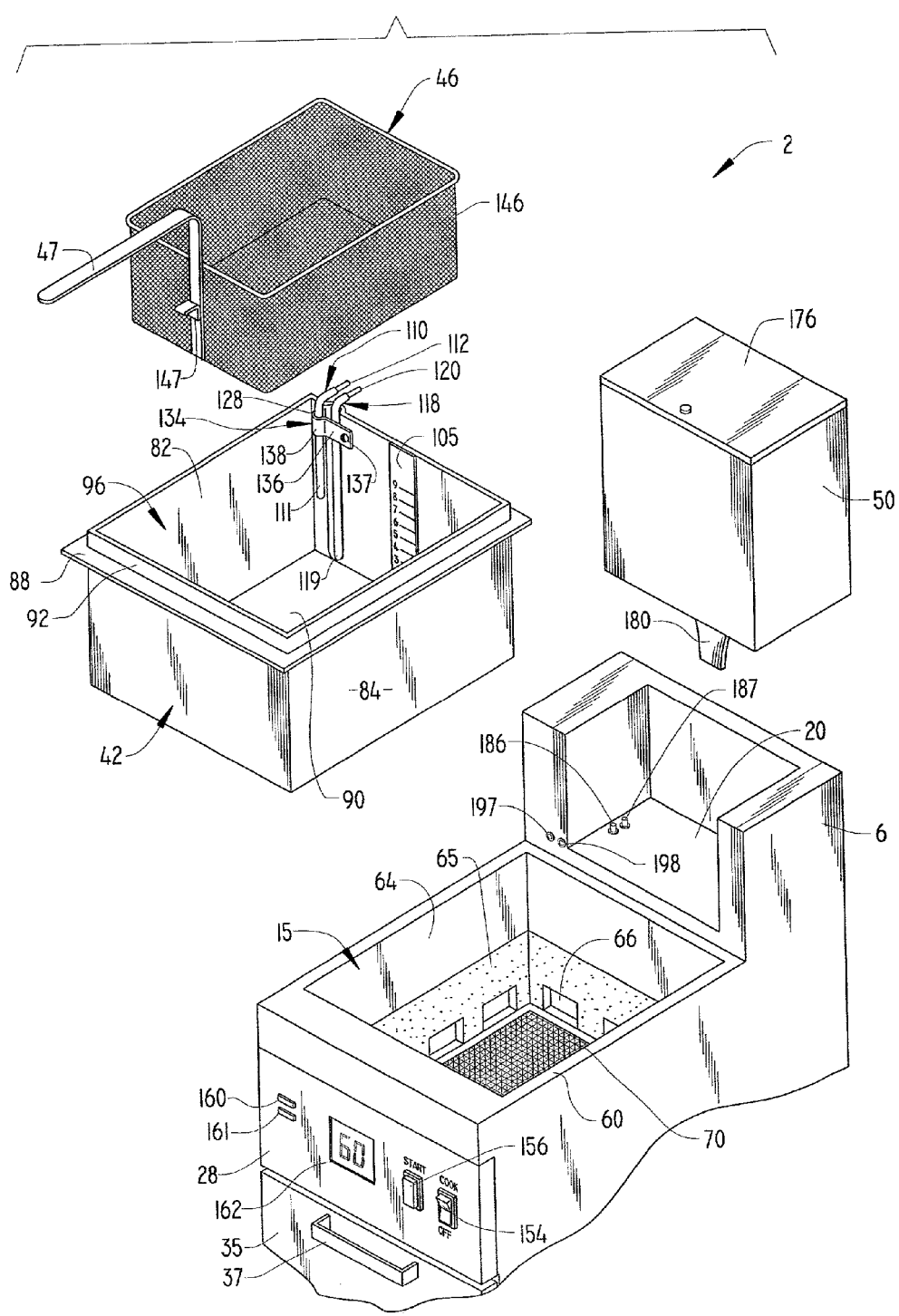
FIG. 2 is an exploded view of the main components of the fryer system of FIG. 1.

With initial reference to FIGS. 1 and 2, a deep fryer constructed in accordance with the present invention is generally indicated at 2. Fryer 2 is shown to include a housing or cabinet shell 6 that is adapted to be supported upon a floor through a plurality of legs 10. Housing 6 defines a recessed cavity 15, as well as a rear platform 20. At a front portion of housing 6 is mounted a control panel 28, as well as a pivotable door 35 having an associated handle 37. Fryer 2 also includes a vat 42 which, as will be described more fully below, is adapted to be selectively positioned within recessed cavity 15. Fryer 2 also includes a basket 46 having a handle 47. Finally, a container 50, adapted to house a supply of replenishing oil for vat 42, is removably mounted upon rear platform 20.

Figure 4:
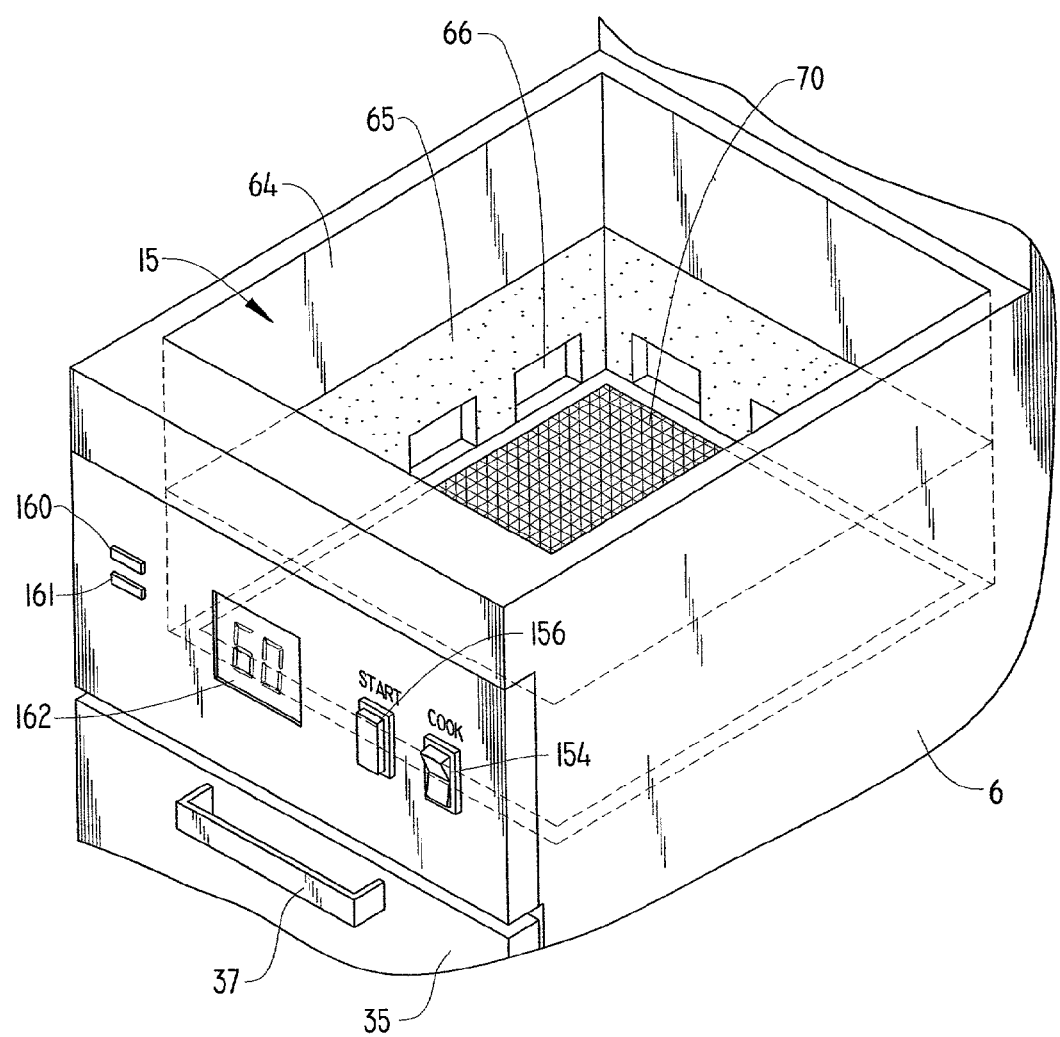
FIG. 4 is a perspective view of a portion of the fryer system of FIG. 1, particularly depicting a heater arrangement utilized in accordance with a preferred embodiment of the invention.

Particular reference will now be made to FIGS. 1, 2 and 4 in describing additional details particularly associated with housing 6. As shown, housing 6 preferably includes an upper peripheral ledge 60 that extends about recessed cavity 15. Recessed cavity 15 itself has upper and lower side wall portions 64 and 65, with at least upper side wall portion 64 being defined by a heat shielding insulation and lower side wall positions 65 being provided with various exhaust openings 66. At a bottom of recessed cavity 15 is provided a heating unit which is generally indicated at 70. In accordance with the most preferred form of the invention, heating unit or heater 70 is constituted by an infrared gas burner having electronic ignition and variable heat output as will be discussed more fully below. Exhaust openings 66 are provided at lower side wall portion 65, above heating unit 70, for exhausting gases which, preferably, are directed out housing 6 below and behind platform 20.

Figure 3:
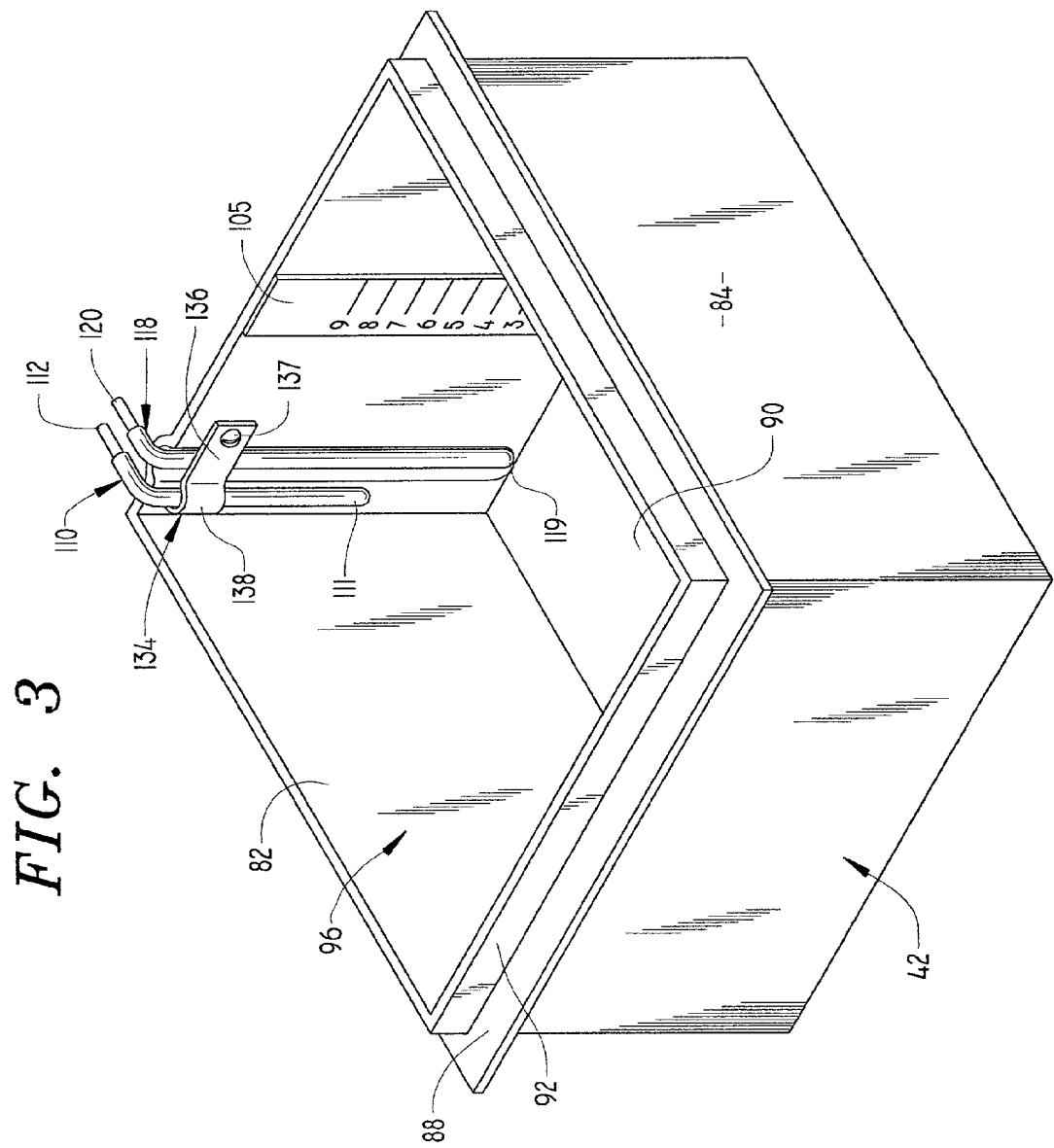
FIG. 3 is a detailed view of a fry pot incorporated in the fryer system of FIG. 1.

As perhaps best shown in FIGS. 1–3, vat 42 includes a plurality of walls 82 having associated outside surfaces 84. Although not shown, in the most preferred form of the invention, outside surfaces 84 would be blackened for heat transfer purposes. Vat 42 also includes a peripheral rim 88 that extends outwardly from walls 82 and which is adapted to rest upon upper peripheral ledge 60 of housing 6 when vat 42 is inserted within recessed cavity 15, with bottom 90 of vat 42 also being blackened and spaced above heating unit 70. Vat 42 is also shown to include an upper extension 92 which projects above peripheral rim 88. An interior 96 of vat 42 is adapted to contain a cooking medium, particularly cooking oil. Preferably, an oil level indicator strip 105 is mounted on one of walls 82 in order to enable a quick visual reference of the level of the oil.

Also extending into interior 96 of vat 42 is a first sensor 110. In accordance with the most preferred form of the invention, sensor 110 constitutes a thermocouple having a tip 111 which projects a considerable distance below upper extension 92 and a terminal plug 112 arranged remote from interior 96. As shown, a second sensor 118 is positioned against one of walls 82. Second sensor 118 is also preferably constituted by a thermocouple that includes a tip portion 119 in contact with bottom 90 and a terminal plug 120 which extends away from interior 96. In the most preferred form of the invention, a respective wall 82 of vat 42 is provided with an elongated indentation 128 within which tip portion 119 of second sensor 118 extends. A bracket 134 includes a first portion 136 that is secured to vat 42 for the use of a mechanical fastener 137, and a curved portion 138. First portion 136 of bracket 134 preferably projects across second sensor 118, while curved portion 138 extends about first sensor 110. In this fashion, bracket 134 secures first and second sensors 110 and 118 in a desired position. In accordance with this embodiment, first sensor 110 is adapted to be utilized in sensing the temperature of cooking oil placed within vat 42, while second sensor 118 is utilized to sense a temperature of vat 42 directly at bottom 90. The manner in which the sensed signals are utilized in connection with the overall operation of fryer 2 will be detailed below.

In general, basket 46 is constructed in a manner widely known in the art so as to include a wire mesh body 146. As shown, control panel 28 includes a main power switch 154 which can be used to turn fryer 2 on or off. Even with main power switch 154 turned to the "ON" or "COOK" position, the operation of a cooking sequence with fryer 2 is preferably initiated through the use of a start switch 156. In general, the start switch 156 takes the form of a button. Preferably, start switch 156 would be activated before or simultaneously with the placing of basket 46 in fryer 2 or the cooking sequence of fryer 2 could be automatically controlled, such as based on a sensed, rapid temperature drop in the oil. Control panel 28 includes a first indicator 160, which is preferably linked to main power switch 154 in order to provide an illuminated signal concerning the activation condition of fryer 2. A second indicator 161 constitutes a light which becomes illuminated upon depressing of start switch 156. Shown centrally along control panel 28 is a time indicator 162, which preferably takes the form of a multi-digit LED or LCD display.

Figure 5:
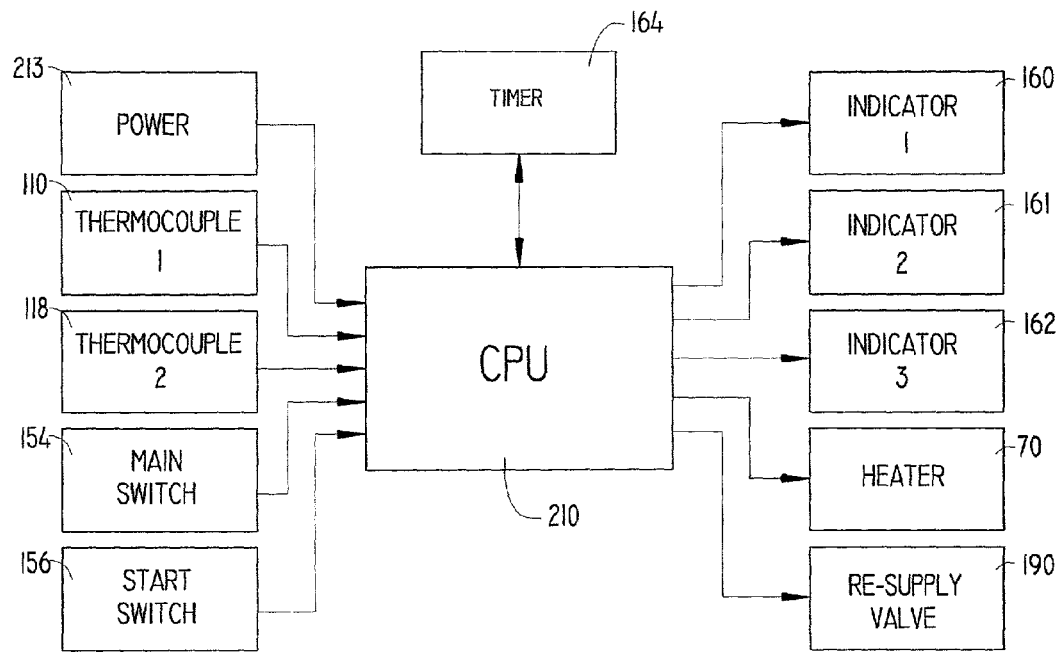
FIG. 5 is a block diagram of an overall control arrangement for the fryer system.

Finally, of the main components of fryer 2, resupply container 50 is shown to include a lid 176 and a spout 180. As indicated above, container 50 is adapted to be supported upon rear platform 20 of housing 6. In this position, spout 180 extends below platform 20 so as to be above recessed cavity 15 as clearly shown in FIG. 1. At platform 20, housing 6 is provided with a pair of electrical connectors 186 and 187 which are used to activate an electronic valve, generically indicated in FIG. 5 at 190 arranged within container 50 in order to selectively dispense oil from spout 180 in a manner which will be described more fully below. Although also not shown, container 50 can incorporate an internal heater for liquefying a cooking medium as needed. Also shown as part of housing 6 adjacent platform 20 is a pair of sockets 197 and 198 which are adapted to receive plugs 112 and 120 respectively.

Figure 6:
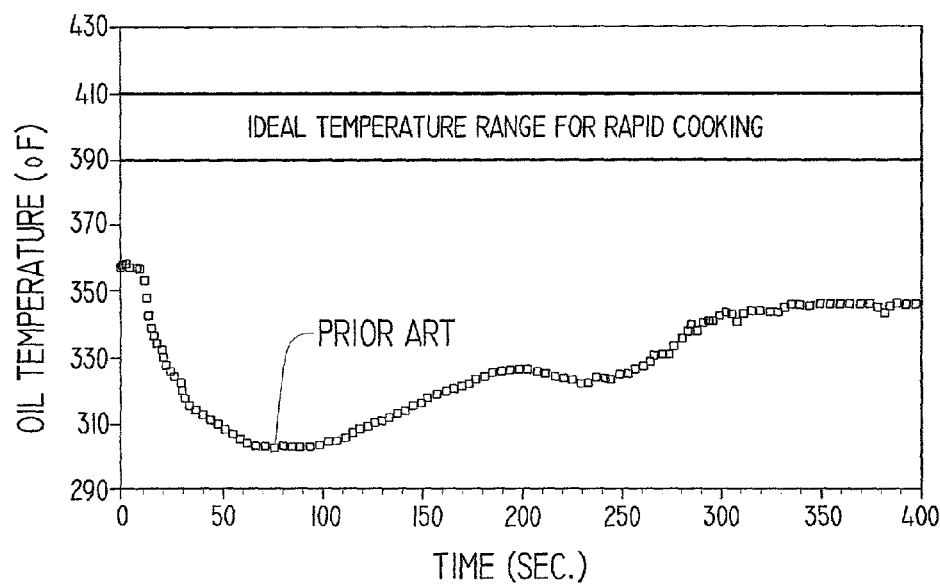
FIG. 6 is a graph comparing a known oil temperature curve with that of the fryer system of the present invention.

In general, fryer 2 is utilized by positioning vat 42 within recess cavity 15, with plugs 112 and 120 being simultaneously inserted within sockets 197 and 198 respectively. Vat 42 is supplied with a cooking oil which, in the preferred embodiment, represents a relatively small amount compared to fryers used throughout fast food restaurants today. Specifically, vat 42 is preferably sized to receive in the range of 6–9 pounds of a cooking medium. In general, basket 46 is commensurate in size with those currently found in the marketplace, however, vat 42 is made much smaller so as to more closely conform to the overall body 146 of basket 46. Container 50 is mounted upon rear platform 20 while being aligned with electrical connectors 186 and 187. Further details of the operation and synergistic results achieved through the use of fryer 2 will now be described with particular reference to FIGS. 5 and 6.

As indicated above, the present invention defines a fryer system 2 having a greatly reduced cook time compared to prior known arrangements, while further representing significant oil saving costs. In connection with the operation of fryer 2, a CPU 210 is interconnected through a power supply 213 which is preferably represented by a standard AC electrical outlet. With main switch 154 positioned in the "COOK" position, CPU 210 can control heating unit 70 to heat the cooking oil provided within vat 42. The temperature of the cooking oil is relayed to CPU 210 through thermocouple 110. In order to provide the reduced cook time, the temperature of the cooking oil in accordance with the present invention is provided in the range of 380°–410° F. Most preferably, the temperature range is between 390°–410° F. Once this temperature is reached, as relayed to the user through indicator 161, french fries or other food items placed within basket 46 can be lowered into vat 42. With the depression of start switch 156, a timer 164 will reset indicator or display 162 and begin a countdown of the cook time.

Based on the operation of fryer 2 in connection with cooking an exemplary pound of french fries, as will become more fully evident below, the french fries are adapted to be cooked in less than or equal to 70 seconds and, most preferably, about 60 seconds. In other words, the cook times are generally less than or equal to ⅓ to ½ of a customary cook time found in this art.

Because of the initial high temperature differential between the french fries and the cooking oil, the energy source defined by heating unit 70, which has a variable heat input rate, is initially controlled through CPU 210 to increase the heat input to the food items. In accordance with the example of cooking french fries, this initial cooking stage provides a heat input to the french fries of greater than 50,000 Btu/hr/lb. Most preferably, the heat input during this initial cooking stage is greater than or equal to 75,000 Btu/hr/lb. In general, during the initial cooking stage, 40–60% of the total energy needed for cooking is imparted to the product. Of the overall cooking time, this initial cooking stage generally constitutes about a quarter of the time and, most preferably, less than or equal to 15 seconds. Based on this initial controlling of heating unit 70, even though there is a rather larger temperature differential between the french fries and the cooking oil, the temperature of the cooking medium is maintained within the desired range.

After the initial cooking stage, the heating rate for the cooking medium is reduced while maintaining the desired temperature. Again, this is controlled through CPU 210 based on signals received from at least sensor 110. Additional signals received from sensor 118 assures bottom 90 does not overheat, while potentially enabling a more accurate control of heating unit 70 by anticipating necessary heat input changes based on the temperature of vat 42. Since heating unit 70 preferably extends along substantially the entire bottom 90 of vat 42, a relatively uniform heating of the cooking medium occurs. Additionally, natural and forced (bubble) convection aids in establishing uniform heating. As indicated above, the byproducts of combustion are drawn through natural and at least partially forced convection from between heating unit 70 and bottom 90, through exhaust outlets 66 and cabinet 6 preferably adjacent platform 20, and exiting at the upper back portion of housing 6. With this arrangement, the exhaust gases will also function to preheat the oil in container 50, preferably to about 200°–250° F. An induction fan (not shown) or exhaust recirculation could be employed to enhance oil heating. In any event, as clearly shown in FIG. 6, an ideal temperature range is maintained by controller 210. The oil temperature is preferably maintained below 410° F., preferably between 390° and 410° F., to avoid rapid oil degradation, as well as to protect against scorching and imparting off-flavors to the product, particularly based on the oil level utilized in accordance with the invention.

During the cooking operation, the food items will inherently soak up a certain amount of the cooking oil. Given the low amount of cooking oil utilized in accordance with the invention, a significant fraction of this cooking oil could be soaked up. For example, in the case of french fries, in the order to 15% of the final product weight can be represented by cooking oil which has been soaked into the product. Utilizing the low amount of oil in connection with the invention assures a relatively high turnover rate in that the average age of the oil in vat 42 is relatively low. That is, the oil gets carried out in the product before the oil has any appreciable time to degrade to an unacceptable level. However, it is necessary to assure that the oil is replenished. Although this could be performed manually, it is preferable in accordance with the present invention to automatically or periodically refill vat 42 by the oil in container 50. Therefore, CPU 210 functions to signal resupply valve 190 to cause a pre-established amount of oil to be introduced into vat 42. In any event, this level can be regulated in various ways, such as based on the number of cooking operations or through a direct sensing arrangement. If too low of an oil level is present in either vat 42 or even container 50, such as through sensor 110 and/or sensor 118, an alarm (not shown) can sound. In addition, or in the alternative, activation of fryer 2 through start switch 156 can be prevented by controller 210. Regardless, given the relatively high turnover of oil, the need to dispose of oil is reduced or completely eliminated in accordance with the present invention which therefore results in a huge savings for the restaurant owner. However, since the operating conditions of fryer 2 specify a fast cooking operation, the amount of oil transferred to the product is somewhat reduced which further minimizes oil costs and reflects appreciably on the quality of the food product.

With the control of heating unit 70, the "U-curve" associated with prior known arrangements is greatly reduced and an extremely uniform overall cooking arrangement is established. Although the presence of a small amount of cooking oil has a potential disadvantage in that the oil cannot act as a thermal storage for energy, thermal storage is not necessary in accordance with the present invention due to the ability of heating unit 70 to provide high input rates. Although, as indicated above, heating unit 70 is preferably constituted by an infrared gas burner arrangement, other types of high temperature and high efficiency heating arrangements could be readily employed. However, with the low amount of cooking oil, the surface area to volume ratio is high such that the oil temperature can rise at a rapid rate. Having less oil also means that the heat input is physically closer to the food product such that the heat arrives faster. Finally, in a small quantity of oil, the turbulence caused by bubbles at the surface of the frying material can carry over to the walls 82 of vat 42, thereby greatly increasing the heat transfer coefficient at walls 82 relative to that of natural convection.

Although described with respect to a preferred embodiment of the invention, additional changes and/or modifications could be made to the invention without departing from the spirit thereof. For instance, a mechanism can be employed to automatically lower basket 46 upon depressing start button 156 and to raise basket 46 when the elapsed time is complete. Given that a few seconds could result in a significant amount of additional cooking, this automated operation, preferably performed through controller 210, may be desirable. In the alternative, or in addition to the above, an audible alarm is provided in a manner common in the art. In addition, a periodic or continuous filtering or cleansing system for the cooking oil can be employed. As indicated above, the reduced amount of oil utilized in accordance with this invention greatly minimizes or eliminates the need for such a filtering system, but it may be desirable to remove burnt comestibles from within the vat 42. With respect to oil replenishment, it should be noted that deep fat fryer systems employed in certain restaurants pump fresh and used oil to respective storage tanks that are refilled/emptied by service personnel. It should be readily recognized that deep fryer 2 of the present invention could be hooked up to remote storage tanks through suitable hoses in a similar manner.

Again, although the preferred embodiment of the present invention has been disclosed with particular reference to the cooking of french fries, it should be recognized that various food products can be cooked in deep fryer 2. Obviously, the cook time, oil temperature, vat oil quantity and heat input rate could vary depending upon the particular food product being cooked. In accordance with the present invention, it can be generically stated that the cook time employed with deep fryer 2 is in the order of about ⅓ to ½ of a typical cook time found in the industry. With respect to oil temperature, the higher temperature employed is about 40 or more degrees Fahrenheit above a conventional oil temperature, but preferably always less than or equal to 410° F. With respect to the quantity of oil in vat 42, only enough oil to cover the product being cooked plus a small amount more, such as in the order of ⅛" to ½" above the product, is employed. Preferably, the volume of oil at the cooking temperature should be in the order of 3.0 to 4.75 times the volume of food product. It should be noted that this refers to the actual volume of the food product, i.e., without air spaces. In addition, this volume relationship is based on the oil being heated, as the oil expands when heated. In any event, this is considerably less than conventional fryer systems wherein food products are typically submerged well below an upper oil level in a cooking vat. Related to the minimal quantity of oil is that the width of vat 42 is such that basket 46 just fits therein with a minimal amount of clearance, while also being arranged directly adjacent bottom 90. Finally, with respect to the required heat input, the rate is controlled to greatly reduce or eliminate the U-curve as discussed above, while enabling oil temperature recovery to occur in the preferred 15 second period. In general, the heat input rate can be estimated by dropping a basket of product into the fryer vat at a desired initial temperature with the burner turned off, followed by measuring the oil temperature over time. The percentage of the total temperature drop that occurs after 15 seconds is then multiplied by a theoretical amount of energy required to cook a pound of the product in order to arrive at the required energy input. The theoretical energy is calculated from knowledge of the amount of water loss from the product during the cooking process, the initial product temperature and the estimated final water vapor temperature and heat capacity of the dry product. Again, all of these parameters have been specifically identified with respect to a preferred embodiment of the invention in connection with cooking french fries, but the invention is certainly not limited for use with this particular food product. Instead, the invention is only intended to be limited by the scope of the following claims.

I/We claim:

1. A system for frying food items, the system comprising:
a vat for holding and heating cooking oil;
an energy source able to provide heat to the vat by automatically selecting one of at least three input heating rates; and
a controller for receiving signals indicative of a temperature of the oil and the vat and providing an output signal to the energy source.

2. The system according to claim 1, further comprising a container for providing non-recycled oil to the vat.

3. The system according to claim 1, further comprising:
a first sensor for detecting a temperature of the oil cooking in the vat; and
a second sensor for detecting a temperature of the vat.

4. The system according to claim 2, wherein the container further comprises an electronic valve responsive to a signal from the controller.

5. The system according to claim 1, further comprising: a housing including a recessed cavity within which the vat is situated, said recessed cavity being provided with heat shielding insulation.

6. The system according to claim 1, wherein the energy source constitutes an infrared gas burner.

7. The system according to claim 6, wherein the vat includes a bottom wall, said infrared burner being positioned beneath the bottom wall and extending substantially an entire extent of the bottom wall.

8. A system for frying food items, the system comprising:
a vat for holding and heating cooking oil;
an energy source for providing heat to the vat in at least three input heating rates;
a controller for receiving signals indicative of a temperature of the oil and the vat and providing an output signal to the energy source; and
a container for fresh oil mounted above the vat, the container further comprising a control valve responsive to the controller.

9. The system of claim 8, further comprising sensors operably connected to the vat and the controller for providing temperature signals.

10. The system of claim 8, wherein the vat is sized to hold about 6–9 lbs of cooking oil.

11. The system of claim 8, further comprising a cooking basket about the size of the vat.

* * * * *